United States Patent
Wang et al.

(10) Patent No.: US 10,243,835 B2
(45) Date of Patent: Mar. 26, 2019

(54) SEAMLESS SERVICE FUNCTION CHAINING ACROSS DOMAINS

(71) Applicant: Fujitsu Limited, Kawasaki-shi, Kanagawa (JP)

(72) Inventors: Xi Wang, Murphy, TX (US); Qiong Zhang, Plano, TX (US); Paparao Palacharla, Richardson, TX (US); Victor Mehmeri, Kongens Lyngby (DK); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 15/423,167

(22) Filed: Feb. 2, 2017

(65) Prior Publication Data
US 2018/0219762 A1   Aug. 2, 2018

(51) Int. Cl.
| | |
|---|---|
| H04L 12/715 | (2013.01) |
| H04L 12/851 | (2013.01) |
| H04L 12/24 | (2006.01) |
| H04L 29/08 | (2006.01) |
| H04L 12/741 | (2013.01) |

(52) U.S. Cl.
CPC .......... *H04L 45/04* (2013.01); *H04L 41/0806* (2013.01); *H04L 45/74* (2013.01); *H04L 47/2441* (2013.01); *H04L 67/2809* (2013.01); *H04L 67/34* (2013.01)

(58) Field of Classification Search
CPC ......... H04L 45/04; H04L 45/74; H04L 67/34; H04L 47/2441; H04L 67/10; H04L 41/0806
See application file for complete search history.

(56) References Cited

U.S. PATENT DOCUMENTS

| | | | |
|---|---|---|---|
| 6,219,692 B1 | 4/2001 | Stiles | |
| 2016/0165014 A1* | 6/2016 | Nainar | .................... H04L 69/22 370/392 |

OTHER PUBLICATIONS

Jo, In-Cheol, et al. "A Study of Service Function Chaining in Network Function Virtualization." International Journal of Software Engineering and Its Applications 10.7 (2016): 93-100; 8 pages.
Halpern, Joel, et al. "Service function chaining (SFC) architecture." No. RFC 7665. 2015; 32 pages.
(Continued)

*Primary Examiner* — Afshawn M Towfighi
(74) *Attorney, Agent, or Firm* — Baker Botts L.L.P.

(57) ABSTRACT

In one or more embodiments, one or more systems, methods, and/or processes may receive a service function chain description that includes service functions associated with multiple domains, and rather than any of the domains ignoring or rejecting outside nodes, nodes may be configured to communicate with the outside nodes in implementing a service function chain associated with the service function chain description. For example, an arbiter (e.g., a central arbiter) may provide control information and/or configuration information, based on the service function chain description, to one or more systems of each domain. In one instance, the arbiter may provide the control information and/or the configuration information to a border node of each domain. In another instance, the arbiter may provide the control information and/or the configuration information to a domain controller of each domain.

16 Claims, 8 Drawing Sheets

(56) References Cited

OTHER PUBLICATIONS

Quinn, Paul, et al. "Problem statement for service function chaining." (2015); 13 pages.
Yanagawa, Toshihide. "OpenStack-based Next-generation Cloud Resource Management." Fujitsu Sci. Tech. J 51.2 (2015): 62-65; 4 pages.
Mayoral, A., et al. "Integrated IT and network orchestration using OpenStack, OpenDaylight and active stateful PCE for intra and inter data center connectivity." Optical Communication (ECOC), 2014 European Conference on. IEEE, 2014; 3 pages.
Bifulco, Roberto, et al. "Ready-to-deploy service function chaining for mobile networks." NetSoft Conference and Workshops (NetSoft), 2016 IEEE. IEEE, 2016; 9 pages.
Kumar, S., et al. "Service function chaining use cases in data centers." IETF SFC WG (2016); 23 pages.
D. Dolson et al. "Hierarchical Service Chaining" S. Homma Internet-Draft K. Naito Intended status: Informational NTT Expires: Nov. 26, 2015 DR Lopez Telefonica I+ D. Analysis (2015); 11 pages.
Sahhaf, Sahel, et al. "Network service chaining with optimized network function embedding supporting service decompositions." Computer Networks 93 (2016): 492-505; 25 pages.
Liu, Changbin, et al. "Cloud resource orchestration: A data-centric approach." Proceedings of the biennial Conference on Innovative Data Systems Research (CIDR). 2011; 8 pages.
OpenDaylight User Guide; 117 pages.
OpenDaylight Developer Guide, Aug. 31, 2015; 359 pages.
Eramo, Vincenzo, et al. "Server resource dimensioning and routing of service function chain in NFV network architectures." Journal of Electrical and Computer Engineering 2016; 13 pages.
Ghaznavi, Milad, et al. "Service function chaining simplified." arXiv preprint arXiv:1601.00751 (2016); 9 pages.
Medhat, Ahmed M., et al. "Near optimal service function path instantiation in a multi-datacenter environment." Network and Service Management (CNSM), 2015 11th International Conference on. IEEE, 2015; 6 pages.
Quinn, Paul, et al. "Network service header." draft-quinnsfc-nsh-10 (2016); 37 pages.
H., Li, et al. "Service function chaining (SFC) control plane architecture." draft-ww-sfc-control-plane-04 2015; 20 pages.

* cited by examiner

SEAMLESS SERVICE FUNCTION CHAINING ACROSS DOMAINS

BACKGROUND

Field of the Disclosure

The present disclosure relates generally to network function virtualization and, more particularly, to systems and methods of establishing service function chaining in multiple domains.

Description of the Related Art

Emerging network applications, such as cloud and big data, may involve joint consideration of IT resources residing within multiple domains within one or more data centers (DCs). Network function virtualization (NFV) can be used to virtualize network functions and migrate them from devices that are built for a single, specific purpose to multi-purpose virtual machines, which may reduce service deployment costs and improve service flexibility. As more service functions move to virtual machines in geographically distributed data centers and as more individually-managed Networks-on-Demand are enabled by software defined networking (SDN) technology, end-to-end network services may implement various mechanisms to coordinate resources across multi-network domains. For example, a network service may traverse one or more consumer broadband networks, mobile backhaul networks, mobile packet core networks, and/or virtual private networks.

Service functions (SFs) can be deployed in various networks. SFs can provide a range of features such as security, server load balancing, and wide area network acceleration, and SFs can be instantiated at various points in a network infrastructure. Service function (SF) deployments have been relatively static and/or bound to a network topology, as in the past, SF deployments do not adapt well to elastic service environments enabled by virtualization for instance. However, data center networks and/or cloud architectures require more flexible SR deployments. Moreover, transitions to virtual platforms can require agile service insertion models that can support dynamic and/or elastic service delivery. Further, SFs can require an ability to easily steer traffic to requisite services.

SUMMARY

The present disclosure provides one or more systems, methods, and/or processes that may receive a service function chain description that includes service functions associated with multiple domains, and rather than any of the domains ignoring or rejecting outside nodes, nodes may be configured to communicate with the outside nodes in implementing a service function chain associated with the service function chain description. For example, the service function chain description may include a first service function associated with a first service node within a first administrative domain and a second service function associated with a second service node outside the first administrative domain (e.g., within a second administrative domain). For instance, a first forwarding node within the first administrative domain may be configured to provide data from the first service function to a second forwarding node outside the first administrative domain (e.g., within the second domain) that forwards traffic to the second service node outside the first administrative domain, and the first forwarding node within the first administrative domain may provide the data from the first service function to the second forwarding node outside the first administrative domain.

In one or more embodiments, a first service classifier (e.g., a first service classifier node) within the first administrative domain may be configured to classify network traffic associated with the service function chain description and to provide the network traffic associated with the service function chain description to the first forwarding node within the first administrative domain. For example, the first service classifier may introduce and/or provide a network service header that may be utilized to steer and/or direct the traffic associated with the service function chain description. For instance, the classifier may set a service function identification and/or label of the network service header based on a classification of the traffic, and the first forwarding node may utilize information of the network service header to steer and/or direct the traffic to the first service node. In one or more embodiments, a second forwarding node outside the first administrative domain (e.g., within a second administrative domain) may be configured, based on the service function chain description and based on the first service function associated with the first service node within the first administrative domain, to provide data from the second service function to the first forwarding node within the first administrative domain that forwards the traffic to the first service node within the first administrative domain. For example, the traffic may be bidirectional.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
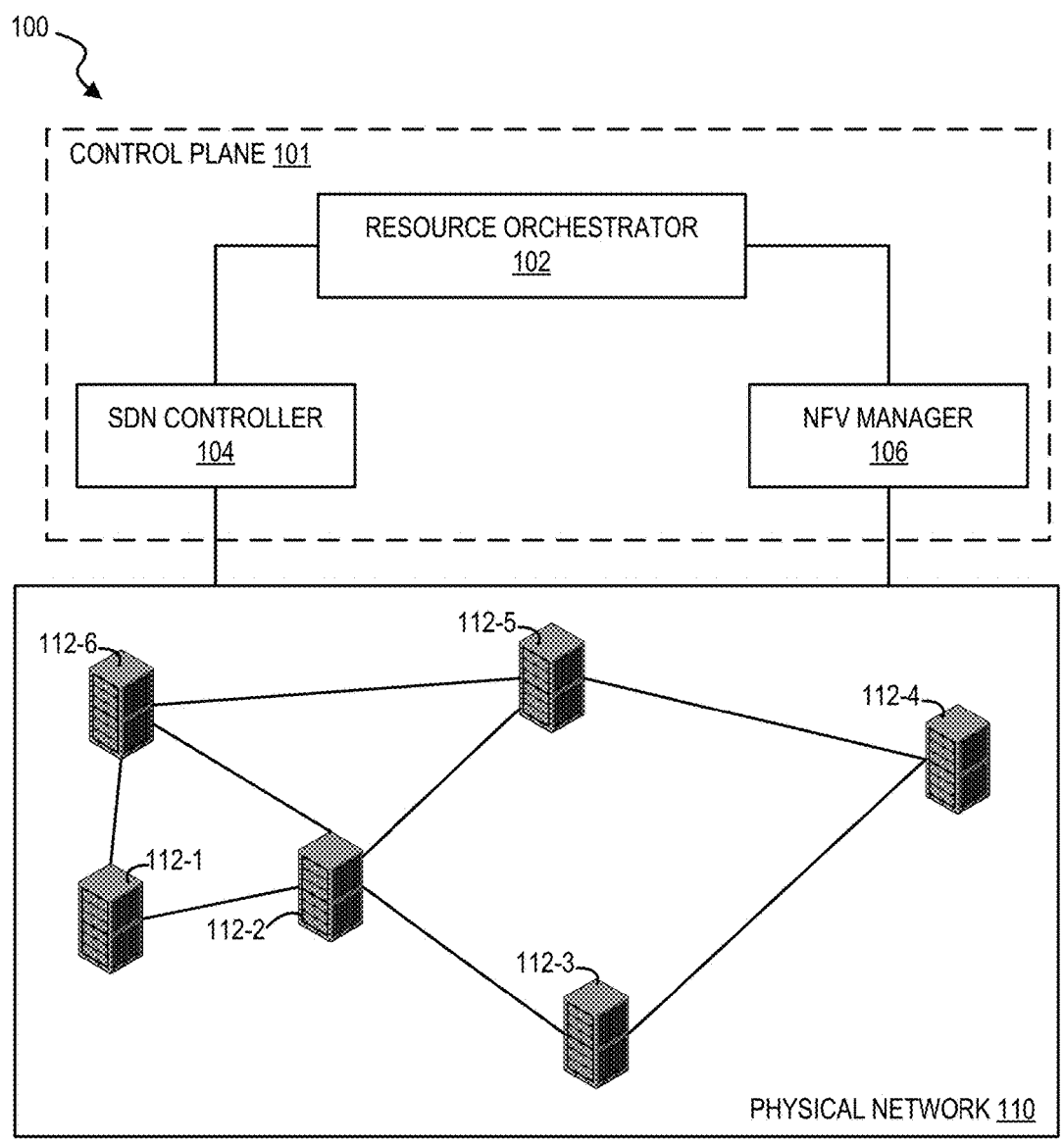
FIG. 1 illustrates exemplary elements of a distributed resource orchestration framework, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

In one or more embodiments, orchestration systems may provide life cycle management of services such as augmented/virtual reality, video distribution, streaming media services, and IoT (Internet of Things), among others. For example, the orchestration systems may provide and/or manage resource allocation and/or deployment of virtual network functions (VNFs) as well as application related service functions (SFs) in software defined infrastructures (SDIs). In one instance, the SFs may include one or more of video codecs, caches, and analytics engines, among others, via network function virtualization (NFV). In another instance, the VNFs may include one or more of firewalls, network address translation (NAT), routing functions, switching functions, and deep packet inspection (DPI), among others. In one or more embodiments, SDIs may include physical network functions (PNFs). For example, the PNFs may include optical transport systems, routers, and/or switches, among others, that may be controlled by a software defined networking (SDN) controller. In one or more embodiments, a high-level management and control architecture for infrastructures that may implement the orchestration systems may include a NFV Management And Orchestration (MANO) that may manage a NFV Infrastructure (NFVI) and lifecycles of VNFs.

In one or more embodiments, orchestration systems may support end-to-end orchestration via resource management and allocation. For example, SDIs may be managed via multiple resource-specific controllers and/or orchestrators that may facilitate individual system deployment and/or troubleshooting. For instance, a datacenter may be managed by a cloud resource orchestrator (e.g., OpenStack, etc.), and the cloud resource orchestrator may provide VMs to SFs and/or VNFs. In one or more embodiments, intra-datacenter networks connecting various VMs may be managed by one or more SDN controllers, and wide area networks (WANs) for inter-datacenter connections may be managed by a different set of one or more SDN controllers. For example, the one or more SDN controllers that manage the intra-datacenter networks connecting various VMs may utilize ONOS (e.g., a network operating system), and the one or more SDN controllers that manage the WANs for inter-datacenter connections may utilize OpenDaylight (e.g., a framework that supports software defined networking and network function virtualization).

In one or more embodiments, partitioning of resource management may create an evolutionary SDI with nodes (e.g., network and/or computing elements) having heterogeneous functions spanning across multiple network domains. In one example, one or more nodes may host service functions (e.g., SFs, VNFs, etc.). In a second example, one or more nodes may provide switch functions (e.g., routers, switches, etc.). For instance, the one or more nodes that may provide switch functions may couple and/or "chain" multiple nodes that may host service functions. In another example, one or more nodes may host both service and switch resources (e.g., "whitebox" switches with embedded servers supporting VNFs). For instance, the one or more nodes that may host both service and switch resources may provide resource-efficient chaining.

In one or more embodiments, orchestrators may interact with users via an intent-based declarative interface to accommodate user requests. For example, an orchestrator may divide a user request into one or more SFs and/or VNFs and may provide a forwarding graph utilizable in delivering a service associated with the user request. In one or more embodiments, orchestrators may provide sizing and placement of VNFs/SFs as well as network connectivity based on the available resources in a SDI. For example, in a case of a video streaming service, orchestrators may instantiate a codec SF via an appropriate node and route the stream to the codec by provisioning associated network connectivity. As such, orchestrators may perform resource allocation that jointly considers VNFs, SFs, and physical network devices for end-to-end service deployment to enable end-to-end service automation and/or to improve resource utilization, according to one or more embodiments.

In one or more embodiments, delivery of end-to-end services may utilize one or more SFs. For example, the SFs may include one or more firewalls, one or more Network Address Translators (NATs), and/or one or more application-specific functions, among others. In one or more embodiments, a service function chain (SFC) may include an ordered set of SFs, where traffic (e.g., network data) is "steered" and/or directed to and/or from the SFs of the SFC. For example, a classifier may steer and/or direct traffic to and/or from the SFs of the SFC. For instance, a SFC may include an ordering constraint that may be applied to traffic, data packets, data frames, and/or data flows based on classification. In one or more embodiments, a SFC may be bidirectional or unidirectional. For example, traffic, data packets, data frames, and/or data flows may be bidirectional or unidirectional.

In one or more embodiments, one or more systems, methods, and/or processes may receive a SFC description that includes SFs associated with multiple domains, and rather than an element of a first domain ignoring or rejecting a SF associated with a node outside the first domain, the elements may be configured to communicate with one or more nodes outside the first domain in implementing a SFC associated with the SFC description. In one example, an arbiter may receive the SFC description that includes SFs associated with multiple domains and may configure domain controllers of the multiple domains in implementing the SFC associated with the SFC description. For instance, the domain controllers may configure one or more elements of their respective domains in implementing the SFC associated with the SFC description. In another example, the arbiter may receive the SFC description that includes SFs associated with multiple domains and may configure border nodes of the multiple domains in implementing the SFC associated with the SFC description.

Turning now to the drawings, FIG. 1 illustrates exemplary elements of an exemplary distributed resource orchestration framework, according to one or more embodiments. As shown, a network domain 100 may be based on nodes that are network elements (NEs). As illustrated, network domain 100 may include a domain-specific resource orchestrator 102 and a physical network 110. In one or more embodiments, physical network 110 may include an underlying optical network, such as an optical transport network (OTN) and/or a flexible optical data plane (e.g., flexible transceivers) configured to adjust the bandwidth of connections.

In one or more embodiments, resource orchestrator 102 may manage and/or coordinate utilization of resources of network domain 100. For example, resource orchestrator 102 may manage and/or coordinate utilization of one or more of NEs 112. For instance, NEs 112 may include one or more types of network functionality, such as switches, routers, etc., and may include hardware that communicatively couples one or more types of physical interfaces.

As shown, network domain 100 may include NEs 112-1 through 112-6, along with communicative couplings among NEs 112-1 through 112-6 that may include various distances. In one or more embodiments, network domain 100 may include a network topology for a single network domain, where resource orchestrator 102 may manage and/or coordinate utilization of resources.

In one or more embodiments, one or more network management functions of network domain 100, other than those provided by resource orchestrator 102, may be provided by a SDN controller 104. For example, in utilization of multiple network domains, each network domain may be managed by a respective SDN controller. For instance, one or more of resource orchestrator 102 and SDN controller 104 may keep track of (e.g., store) one or more network configurations and/or one or more network topologies of network 110.

In one or more embodiments, network domain 100 may be included in a multi-network domain that utilizes distributed processing approach, where messages are exchanged between or among resource orchestrators and/or network controllers, such as resource orchestrator 102 and/or a SDN controller 104, each of which is associated with a respective network of the multi-network domain, such as physical network 110. In one or more embodiments, resource orchestrators may work collaboratively to execute a SFC in a multi-network domain, which may include identifying one or more possible SFC solutions, selecting one or more of the one or more possible SFC solutions for execution (e.g., dependent on preferences and/or various policies, etc.), and configuring physical resources of various network nodes to implement the one or more selected solutions.

As illustrated, network domain 100 may include a NFV manager 106. In one or more embodiments, NFV manager 106 may be utilized in virtualizing network functions and/or migrating network functions from devices that are configured for a single, specific purpose to multi-purpose virtual machines on commercial off-the-shelf servers, which may reduce service deployment costs and/or improve service flexibility. In one example, NFV manager 106 may manage instantiation and/or life cycle of one or more VNFs. For instance, a virtual network function (VNF) may be implemented by and/or executed via a virtual machine (VM). In a second example, NFV manager 106 may store information associated with one or more NEs. For instance, NFV manager 106 may store one or more of a number of virtual machines (VMs), an amount of storage space is available, and an amount of storage space is utilized, among others, associated with a NE. In another example, NFV manager 106 may provide information associated with one or more NEs to resource orchestrator 102.

In one or more embodiments, resource orchestrator 102, SDN controller 104, and NFV manager 106 may form a control plane 101 or at least may form a portion of control plane 101. As described, one or more elements of control plane 101 may configure and/or control network elements of physical network 110, for example.

In a system that utilizes a NFV manager, VNFs may be invoked in an order in providing an end-to-end network service, according to one or more embodiments. In one example, service function chaining may include configuring and/or allocating various VMs to implement and/or execute the virtualized network functions. In another example, service function chaining may include steering, routing, and/or shaping traffic across one or more networks and/or one or more network domains. For instance, a traffic flow may be steered, routed, and/or shaped via a number of VNFs and/or SFs in an order based on one or more preferences and/or policies.

In one or more embodiments, service function chaining may be supported by the application of resource orchestration. For example, resource orchestration elements, referred to herein as resource orchestrators, may collectively and/or individually manage and/or coordinate utilization of one or more resources (including one or more service functions, one or more virtual machines, and/or one or more networks) at each data center, as well as the associated network resources to interconnect the VNFs. With the migration of VNFs to VMs in geographically distributed datacenters and the rollout of SDN controlled on-demand connectivity in IP/OTN networks, distributed resource orchestration across multi-network domains, as described herein, may be beneficial for providing end-to-end network services, according to one or more embodiments. For example, a network service may span across multiple networks such as consumer broadband, mobile backhaul, mobile packet core, and/or virtual private networks (including, e.g., networks implemented on the 1Finity™ platform from Fujitsu Network Communications Inc.), among others.

In one or more embodiments, a large-scale multi-network domain may include multiple different domains, and these domains may have various network technologies, various vendors, various administrations, various types of resources, and/or various virtualized networks. For example, these domains may include domains in that reside IoT devices, computing resources, storage resources, and/or different types of service functions (including access service functions, metro service functions, and/or core service functions). In one or more embodiments, these multi-network domains may preserve confidentiality among domains and may improve scalability for service providers. In one or more embodiments, each network domain may be controlled by a local orchestrator, and vertex-centric distributed computing among the orchestrators may be utilized for end-to-end resource allocation.

Figure 2:
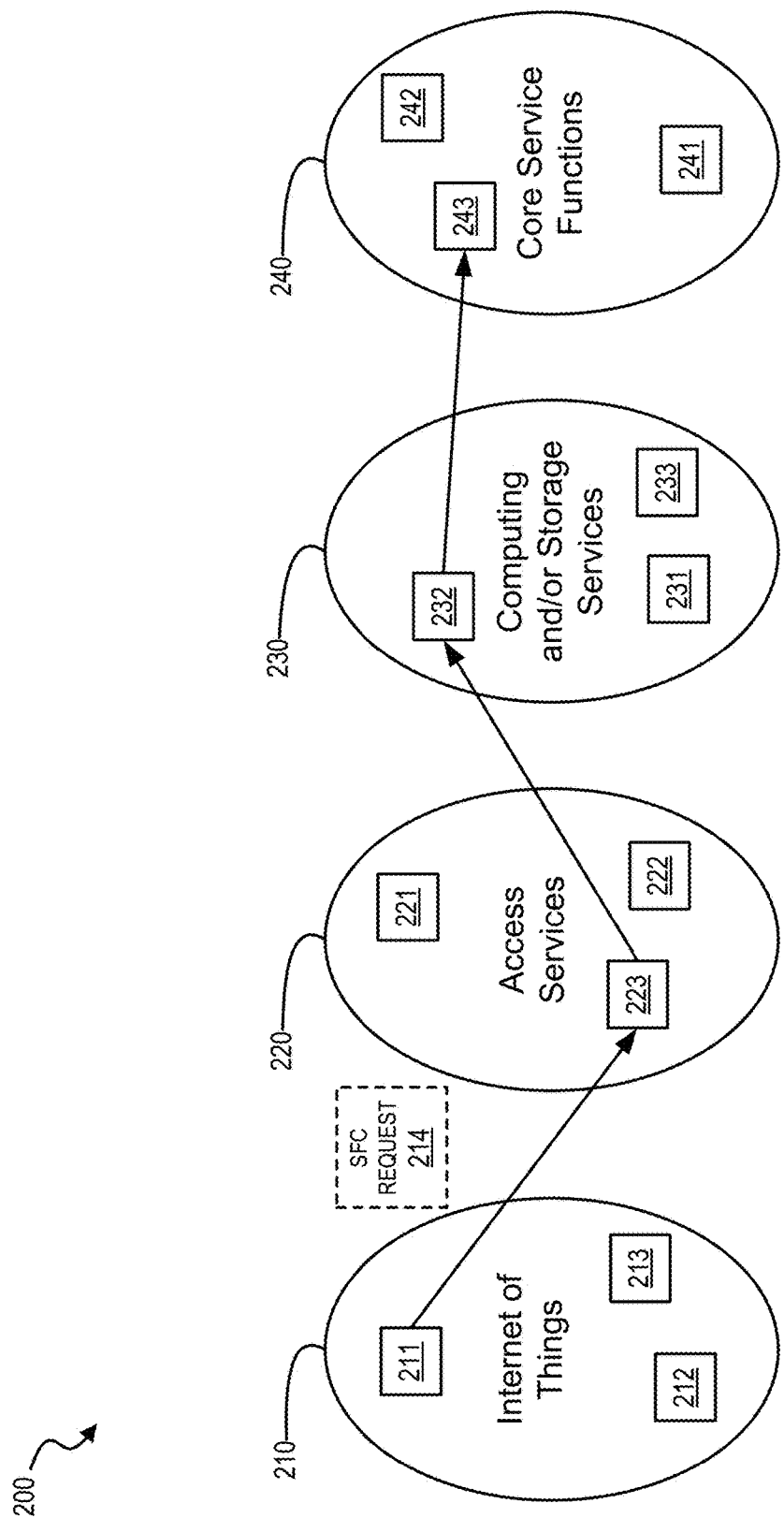
FIG. 2 provides an exemplary block diagram of selected elements of a multi-network domain for providing end-to-end services, according to one or more embodiments.

Turning now to FIG. 2, a block diagram of selected elements of a multi-network domain for providing end-to-end services is illustrated, according to one or more embodiments. As shown, a multi-network domain 200 may include four network domains 210, 220, 230, and 240, and each of domains 210, 220, 230, and 240 may include one or more nodes that may be represented via vertices in determining one or more possible SFC solutions. In one or more embodiments, one or more nodes may implement one or more service functions utilizing resources within a respective domain.

As illustrated, domain 210 may, represent an Internet of Things. For example, one or more of devices 211 through 213 of domain 210 may issue one or more SFC requests. As shown, domain 220 may represent one or more data centers and/or other entities that may provide access services that may be included in a SFC. For example, domain 220 may include services 221 through 223, among others. As illustrated, domain 230 may represent one or more data centers and/or other entities that may provide computing and/or storage services that may be included in a SFC. For example, domain 230 may include services 231 through 233, among others. As shown, domain 240 may represent one or more data centers and/or other entities that may provide core service functions that may be included in a SFC. For example, domain 240 may include services 241 through 243, among others.

In an illustrated example, device 211 of domain 210 may issue a SFC request 214, which may include at least one access service, one computing or storage service, and one core service function. More specifically, SFC request 214 may specify a SFC that includes an access service function 223 (which is available on one of the nodes within domain 220), a computing or storage service function 232 (which is available on one of the nodes within domain 230), and a core service function 243 (which is available on one of the nodes within domain 240).

In one or more embodiments, each domain in a multi-network domain may include physical nodes and/or Internet protocol/optical transport network links. In one or more embodiments, a respective resource orchestrator may be associated with each network domain to manage physical nodes and links within the domain. In one or more embodiments, each physical node may include one or more NEs (e.g., one or more network switches, network routers, etc.) and/or one or more compute servers and/or storage elements (e.g., datacenters) capable of invoking a subset of service functions selected from a catalog of service functions.

Some examples of the service functions provided in these multi-network domains include firewalls, DPI, NAT, load balancers, and parental control functions. In one example, a SFC may include a firewall service function, a DPI service function, a parental control service function, and an anti-virus service function, each of which may be provided by one or more nodes in respective different network domains. In another example, a SFC may include a NAT service function between two other types of service functions and/or between other service functions and an Internet access service function, each of which may be provided by one or more nodes in respective different network domains.

Figure 3:
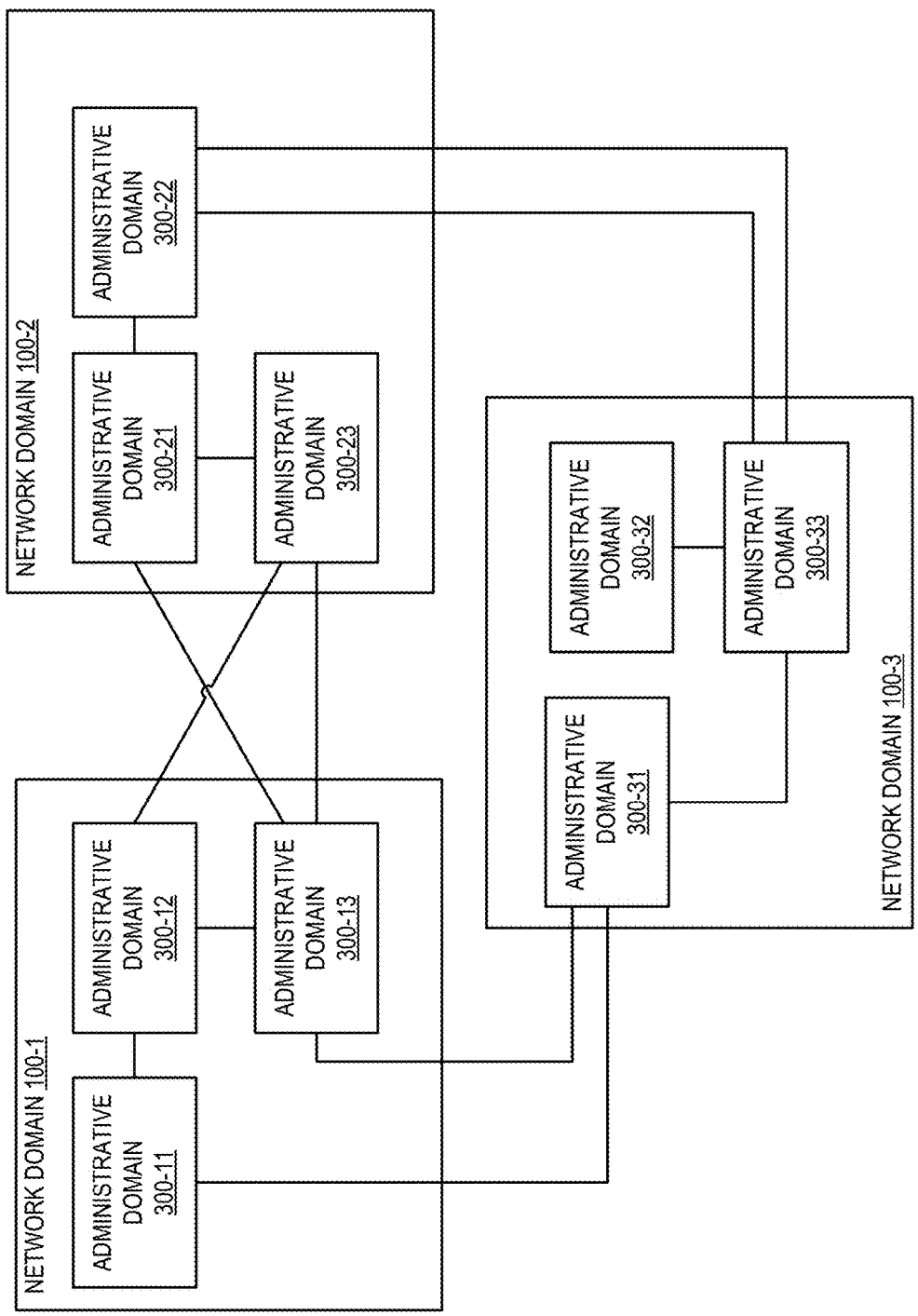
FIG. 3 provides an exemplary block diagram schematic of administrative domains, according to one or more embodiments.

Turning now to FIG. 3, an exemplary block diagram schematic of administrative domains is illustrated, according to one or more embodiments. As shown, a network domain 100 may include one or more administrative domains 300. For example, a network domain 100-1 may include administrative domains 300-11 through 300-13, a network domain 100-2 may include administrative domains 300-21 through 300-23, and a network domain 100-3 may include administrative domains 300-31 through 300-33. As illustrated, administrative domains 300 may be communicatively coupled to one another.

In one or more embodiments, an administrative domain may include one or more structures and/or characteristics of a network domain. In one example, an administrative domain may be and/or resemble a network domain that resides within a network domain. For instance, an administrative domain may include network elements and/or computer systems of a co-location customer and/or entity. In one or more embodiments, an administrative domain may be a network domain. For example, a network domain may not include multiple administrative domains, and the network domain may be an administrative domain.

In one or more embodiments, an administrative domain 300 may implement a portion of a SFC. In one example, administrative domain 300-11 may implement a first portion of a SFC, and administrative domain 300-12 may implement a second portion of the SFC. In another example, administrative domain 300-21 may implement a first portion of a SFC, administrative domain 300-23 may implement a second portion of the SFC, administrative domain 300-31 may implement a third portion of the SFC, and administrative domain 300-33 may implement a fourth portion of the SFC.

Figure 4:
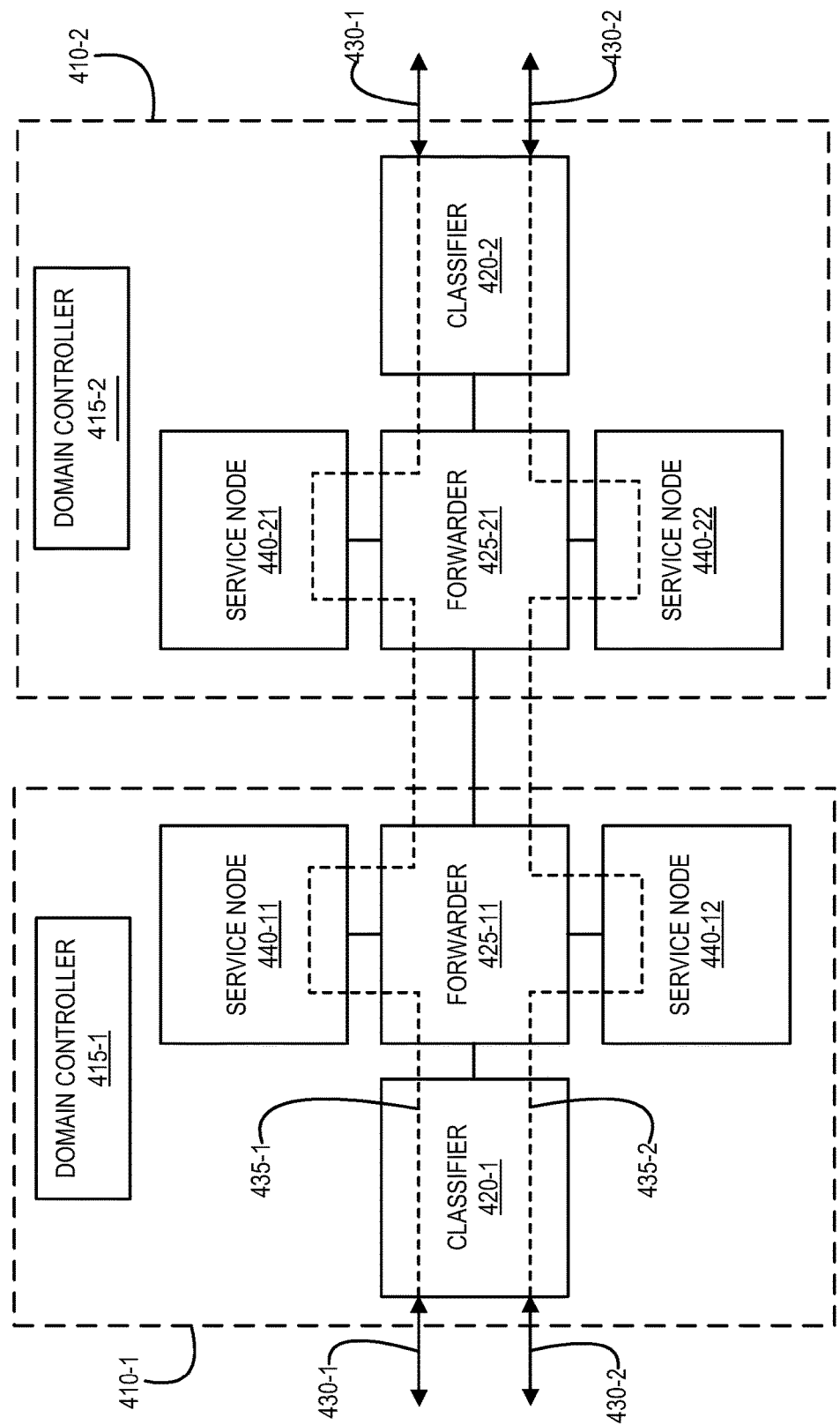
FIG. 4 illustrates exemplary administrative domains, according to one or more embodiments.

Turning now to FIG. 4, exemplary administrative domains are illustrated, according to one or more embodiments. As shown, an administrative domain 410-1 may include a domain controller 415-1, a classifier node 420-1, a forwarder node 425-11, and service nodes 440-11 and 440-12. As illustrated, classifier node 420-1 may be communicatively coupled to forwarder node 425-11, and forwarder node 425-11 may be communicatively coupled to service nodes 440-11 and 440-12. Although not specifically illustrated, domain controller 415-1 may be communicatively coupled to one or more of classifier node 420-1, forwarder node 425-11, and service nodes 440-11 and 440-12. In one or more embodiments, domain controller 415-1 may provide control information and/or configuration information to one or more network elements and/or computer systems of administrative domain 410-1. For example, domain controller 415-1 may provide control information and/or configuration information to one or more of classifier node 420-1, forwarder node 425-11, and service nodes 440-11 and 440-12.

As shown, an administrative domain 410-2 may include a domain controller 415-2, a classifier node 420-2, a forwarder node 425-21, and service nodes 440-21 and 440-22. As illustrated, classifier node 420-2 may be communicatively coupled to forwarder node 425-21, and forwarder node 425-21 may be communicatively coupled to service nodes 440-21 and 440-22. Although not specifically illustrated, domain controller 415-2 may be communicatively coupled to one or more of classifier node 420-2, forwarder node 425-21, and service nodes 440-21 and 440-22. In one or more embodiments, domain controller 415-2 may provide control information and/or configuration information to one or more network elements and/or computer systems of administrative domain 410-2. For example, domain controller 415-2 may provide control information and/or configuration information to one or more of classifier node 420-2, forwarder node 425-21, and service nodes 440-21 and 440-22.

As illustrated, traffic 430 may be received by and/or be provided via classifiers 420. In one or more embodiments, traffic 430 may include data, data packets, data frames, network traffic, and/or data flows, among others. In one or more embodiments, a classifier (e.g., classifier node 420) may be configured to classify traffic and/or data streams. For example, the classifier may be configured to classify traffic and/or data streams based on one or more rules and/or one or more policies. For instance, the one or more rules and/or the one or more policies may be utilized to configure the classifier to classify data and/or traffic via one or more categories (e.g., web, secure shell, email, remote procedure call (RPC), chat, video, audio, DHCP (dynamic host configuration protocol), NAT, DNS (domain name service), IMAP (Internet message access protocol), etc.). In one or more embodiments, a classifier may inspect headers of packets to classify data and/or traffic. For example, the classifier may inspect a port number of packets to classify data and/or traffic. In one or more embodiments, a classifier may inspect payloads of packets to classify data and/or traffic. For example, the classifier may determine one or more classifications regardless of port number or header information. For instance, the classifier may determine one or more classifications based on one or more data signatures.

In one or more embodiments, a classifier may provide information to steer and/or direct data and/or traffic to one or more network elements and/or computer systems for possessing. For example, the classifier may include metadata that may be utilized in steering and/or directing data and/or traffic. In one or more embodiments, a classifier may include a network service header (NSH) and/or modify a NSH that may be utilized by a forwarder to steer and/or direct data and/or traffic to a SF. For example, the classifier may introduce the NSH to steer and/or direct the data and/or the traffic. For instance, the classifier may set a SFC identification (ID) and/or label of the NSH based on a classification of the data and/or the traffic. In one or more embodiments, a forwarder may utilize information of a NSH in steering and/or directing data and/or traffic. For example, the forwarder may utilize a SFC ID and/or label of the NSH to provide the data and/or the traffic to a service node associated with a SF that is associated with a traffic and/or data classification. In one or more embodiments, a NSH may provide a topological independence. For example, an underlying network topology may not be required to change when utilizing a NSH. As illustrated, traffic 430-1 may be steered and/or directed to service node 440-11; traffic 430-2 may be steered and/or directed to service node 440-12; traffic 430-1 may be steered and/or directed to service node 440-21; and traffic 430-2 may be steered and/or directed to service node 440-22.

In one or more embodiments, a classifier may be configured to classify traffic associated with a SFC and/or a SFC description. In one example, the SFC and/or the SFC description may include one or more categories of traffic. In a second example, the SFC and/or the SFC description may include one or more addresses. In another example, the SFC and/or the SFC description may include network masks. In one or more embodiments, a SFC description may include one or more of a SFC and a SFC ID and/or label.

In one or more embodiments, traffic 430 may include data at one or more stages of processing via a SFC. As shown, traffic 430 may traverse a logical path 435 through one or more administrative domains 430. In one example, traffic 430-1 may include data at one or more stages of processing via a first SFC that includes service nodes 440-11 and 440-21, among others. For instance, service nodes 440-11 and 440-21 may process traffic 430-1. In another example, traffic 430-2 may include data at one or more stages of processing via a first SFC that includes service nodes 440-12 and 440-22, among others. For instance, service nodes 440-12 and 440-22 may process traffic 430-2. In one or more embodiments, logical path 435 may be a rendered service path (RSP).

As shown, forwarder nodes 425-11 and 425-21 may be communicatively coupled. In one or more embodiments, forwarder nodes 425-11 and 425-21 may be communicatively via a network tunnel and/or packet encapsulation. In one example, encapsulating packets and/or tunneling packets may create and/or implement an overlay network topology that may be independent of a physical network topology. In another example, the network tunnel may utilize encryption. For instance, the network tunnel may encrypt data that the network tunnel transports.

In one or more embodiments, a forwarder node 425 may be configured to provide and/or receive traffic 430 to and/or from one or more SFs and/or to and/or from another forwarder node 425. In one example, forwarder node 425-11 may be configured to provide and/or to receive traffic 430-1 to and/or from service node 440-11. In a second example, forwarder node 425-11 may be configured to provide and/or to receive traffic 430-1 to and/or from forwarder node 425-21. In a third example, forwarder node 425-21 may be configured to provide and/or to receive traffic 430-1 to and/or from service node 440-21. In another example, forwarder node 425-21 may be configured to provide and/or to receive traffic 430-1 to and/or from forwarder node 425-11. In a similar fashion, forwarder nodes 425-11 and 425-21 may be configured in implementing a SFC that is associated with traffic 430-2 and logical path 435-2.

In one or more embodiments, an administrative domain 300 may include one or more structures and/or one or more functionalities of those described with an administrative domain 410. In one example, administrative domain 300-11 may be administrative domain 410-1 and administrative domain 300-12 may be administrative domain 410-2. For instance, administrative domains 410-1 and 410-2 may be included in a single network domain. In another example, administrative domain 300-22 may be administrative domain 410-1 and administrative domain 300-33 may be administrative domain 410-2. For instance, administrative domains 410-1 and 410-2 may be included in different network domains.

Figure 5A:
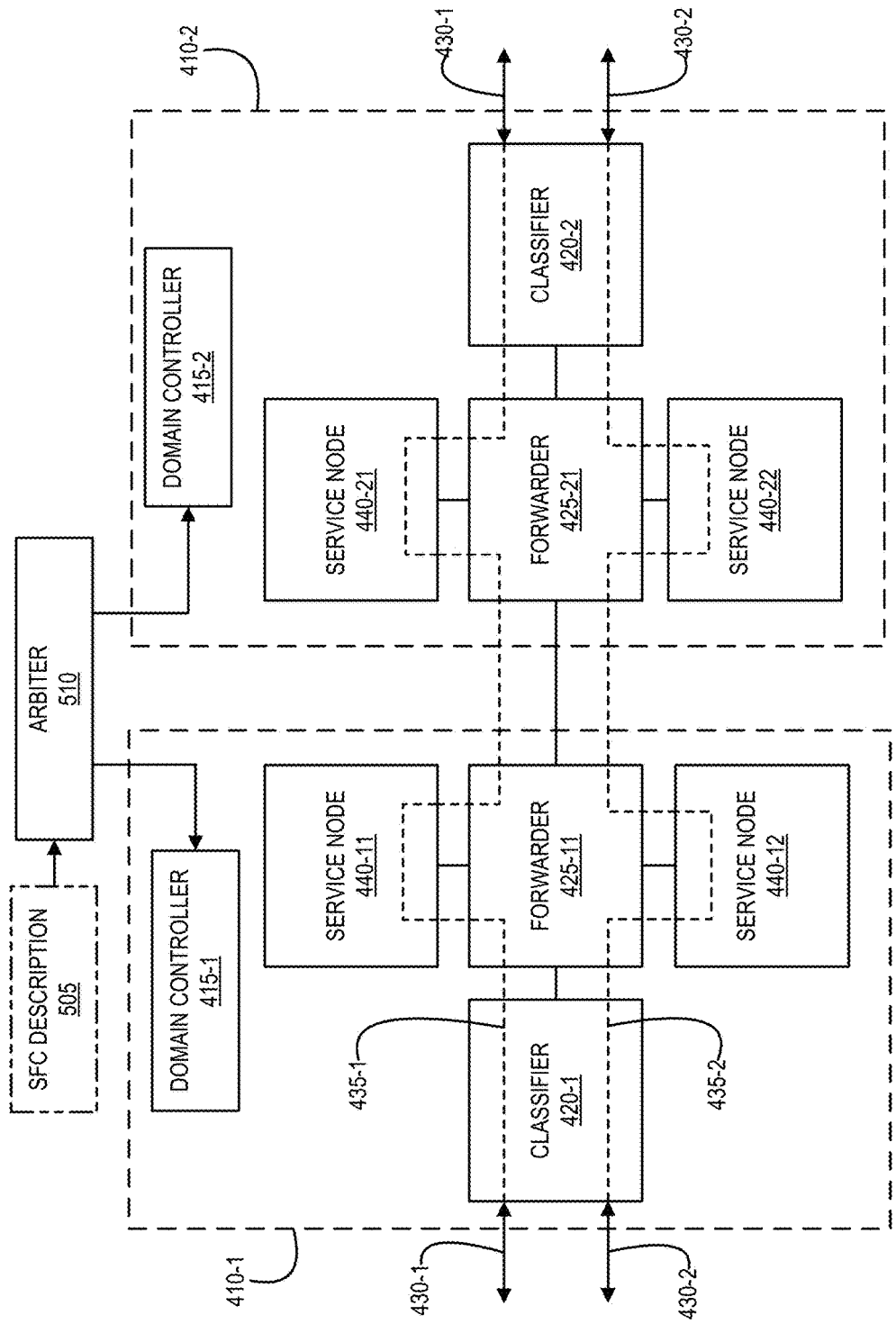
FIG. 5A provides an exemplary block diagram of administrative domains where an arbiter may configure multiple domain controllers, according to one or more embodiments.
Figure 5B:
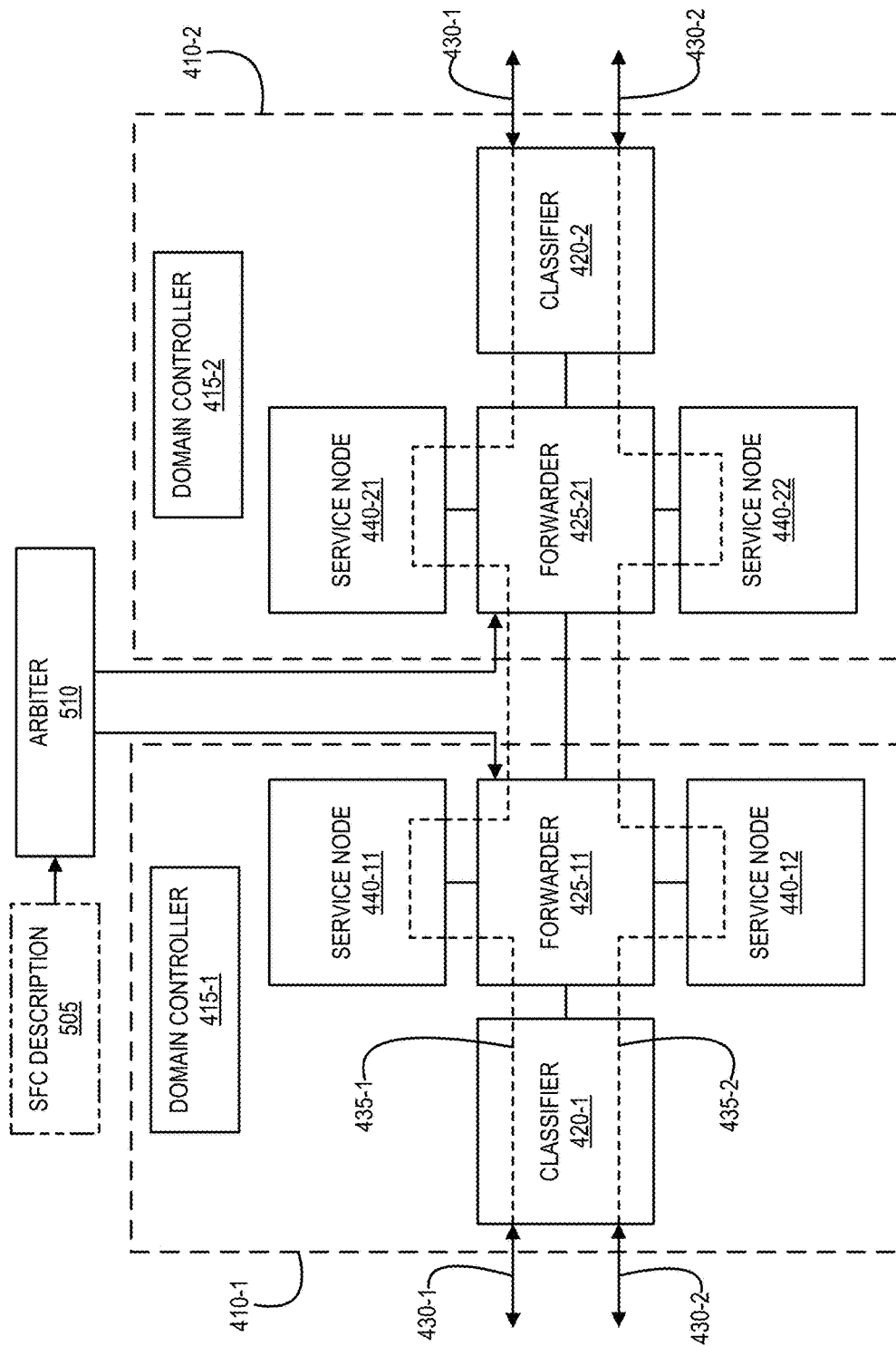
FIG. 5B provides an exemplary block diagram of administrative domains where an arbiter may configure multiple border nodes, according to one or more embodiments.

Turning now to FIGS. 5A and 5B, exemplary block diagrams administrative domains and of an arbiter that may configure elements of the administrative domains are illustrated, according to one or more embodiments. As shown in FIG. 5A, a SFC description 505 may be provided to an arbiter 510. In one or more embodiments, SFC description 505 may be provided via a user. For example, an administrative user may write and/or provide SFC description 505 to arbiter 510. In one or more embodiments, SFC description 505 may be provided via a system. For example, a system may determine a SFC, configure SFC description 505 with the determined SFC, and/or provide SFC description 505 to arbiter 510.

In one or more embodiments, arbiter 510 may be a centralized entity that may forward SFC information and/or may provide configuration information associated with SFC description 505 to participating administrative domains. As illustrated, arbiter 510 may be communicatively coupled to domain controllers 415-1 and 415-2. In one or more embodiments, arbiter 510 may provide control information and/or configuration information to domain controllers 415-1 and 415-2. For example, arbiter 505 may provide control information and/or configuration information associated with one or more SFCs to domain controllers 415-1 and 415-2. For instance, the control information and/or the configuration information associated with the one or more SFCs may be based on SFC description 505 that includes service node 440-11 of administrative domain 410-1 and service node 440-21 of administrative domain 410-2.

In one or more embodiments, a domain controller may include one or more structures and/or one or more functionalities as those described with reference to one or more of resource orchestrator 102, SDN controller 104, and NFV manager 106. In one example, a domain controller 415 may configure one or more network elements of an administrative domain 410. In another example, a domain controller 415 may configure a service node 440. For instance, configuring a service node 440 may include one or more of directing service node 440 to allocate and/or instantiate a VM and implement a SF (e.g., implement a SF via a VM). In one or more embodiments, arbiter 510 may provide control information and/or configuration information to domain controllers 415-1 and 415-2, since domain controllers 415-1 and 415-2 may not accept configurations and/or portions of configurations that include network elements and/or computer systems outside their respective administrative domains. In one example, domain controller 415-1 may not accept a SFC description that includes service node 440-11 and service node 440-21, as service node 440-21 is outside administrative domain 410-1. In another example, domain controller 415-2 may not accept the SFC description that includes service node 440-11 and service node 440-21, as service node 440-11 is outside administrative domain 410-2.

In one or more embodiments, domain controllers 415-1 and 415-2 may receive control information and/or configuration information from arbiter 510 and configure one or more elements of their respective administrative domains to accommodate network elements and/or computer systems outside their respective administrative domains. In one example, domain controller 415-1 may receive control information and/or configuration information from arbiter 510 and configure forwarder node 425-11 to provide traffic 430-1 to forwarder node 425-21. In a second example, domain controller 415-1 may receive control information and/or configuration information from arbiter 510 and configure forwarder node 425-11 to receive traffic 430-1 from forwarder node 425-21. In a third example, domain controller 415-2 may receive control information and/or configuration information from arbiter 510 and configure forwarder node 425-21 to provide traffic 430-1 to forwarder node 425-11. In another example, domain controller 415-2 may receive control information and/or configuration information from arbiter 510 and configure forwarder node 425-21 to receive traffic 430-1 from forwarder node 425-11.

In one or more embodiments, domain controllers 415-1 and 415-2 may receive control information and/or configuration information from arbiter 510 and may authenticate the control information and/or the configuration information. For example, authenticating the received information may ensure that the received information is from arbiter 510. For instance, if the received information cannot be authenticated, the received information may be discarded and/or ignored. In one or more embodiments, domain controllers 415-1 and 415-2 may receive control information and/or configuration information from arbiter 510 in an encrypted fashion. In one example, encrypting the control information and/or the configuration information may provide for one or more private information transfers. In another example, encrypting the control information and/or the configuration information may provide for authenticating the control information and/or the configuration information.

As shown in FIG. 5B, arbiter 510 may be communicatively coupled to forwarder nodes 425-11 and 425-21. In one or more embodiments, arbiter 510 may provide control information and/or configuration information to forwarder nodes 425-11 and 425-21. For example, the control information and/or the configuration information may be based on SFC description 505. In one instance, arbiter 510 may configure forwarder node 425-11 to provide traffic 430-1 to forwarder node 425-21. In a second instance, arbiter 510 may configure forwarder node 425-11 to receive traffic 430-1 from forwarder node 425-21. In a third instance, arbiter 510 may configure forwarder node 425-21 to provide traffic 430-1 to forwarder node 425-11. In another instance, arbiter 510 may configure forwarder node 425-21 to receive traffic 430-1 from forwarder node 425-11.

In one or more embodiments, forwarder nodes 425-11 and 425-21 may receive control information and/or configuration information from arbiter 510 and may authenticate the control information and/or the configuration information. For example, authenticating the received information may ensure that the received information is from arbiter 510. For instance, if the received information cannot be authenticated, the received information may be discarded and/or ignored. In one or more embodiments, forwarder nodes 425-11 and 425-21 may receive control information and/or configuration information from arbiter 510 in an encrypted fashion. In one example, encrypting the control information and/or the configuration information may provide for one or more private information transfers. In another example, encrypting the control information and/or the configuration information may provide for authenticating the control information and/or the configuration information.

Figure 6:
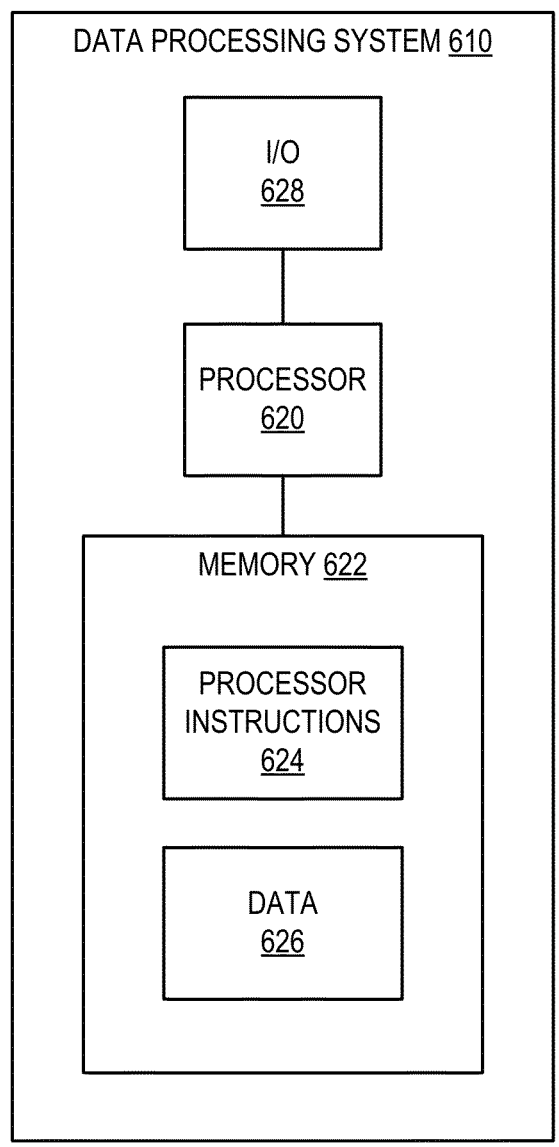
FIG. 6 provides a block diagram of an exemplary data processing system, according to one or more embodiments.

Turning now to FIG. 6, a block diagram of an exemplary data processing system is illustrated, according to one or more embodiments. As shown, a data processing system 610 may include a processor 620, a memory 622 communicatively coupled to processor 620, and an input/output (I/O) subsystem 628 communicatively coupled to processor 620.

In one or more embodiments, memory 622 may include a system, device, and/or apparatus to store processor instructions 624 and data 626 for a period of time. For example, memory 622 may include different numbers of physical storage devices. For instance, memory 622 may include various types components and devices, such as random access memory (RAM), electrically erasable programmable read-only memory (EEPROM), a PCMCIA (personal computer memory card international association) card, ferroelectric RAM (FRAM), flash memory, one or more solid state disks, one or more hard disk drives, one or more magnetic tape libraries, one or more optical disk drives, one or more magneto-optical disk drives, one or more compact disk drives, one or more compact disk arrays, one or more disk array controllers, and/or any suitable selection or array of volatile and/or non-volatile memory. In one or more embodiments, memory 622 may store information (e.g., processor instructions 624, data 626, etc.) for a period of time sufficient to be or include non-transitory computer-readable media. In one or more embodiments, memory 622 may include non-volatile memory. For example, non-volatile memory may refer to memory that retains data after power is turned off.

In one or more embodiments, processor instructions 624 may be executable by processor 620 to implement one or more methods, one or more processes, and/or one or more systems described herein. For example, processor instructions 624 may be configured, coded, and/or encoded with instructions in accordance with one or more of flowcharts, methods, and/or processes described herein. For instance, processor instructions 624 may be executable by processor 620 in implementing seamless service function chaining across multiple domains. In one or more embodiments, data 626 may store information usable by processor 620 and/or processor instructions 624. In one example, data 626 may store information representing a SFC and/or a SFC description. In a second example, data 626 may store configuration information and/or control information. In another example, data 626 may store information representing one or more values of any default and/or one or more configurable parameters utilizable to implement one or more functionalities and/or one or more structures described herein.

In one or more embodiments, I/O subsystem 628 may permit and/or provide interaction with data processing system 610 and/or associated components of data processing system 610. For example, I/O subsystem 628 may include one or more busses, one or more serial devices, and/or one or more network interfaces, among others, that may enable data processing system 610 and/or processor 620 to implement one or more systems, processes, and/or methods described herein. In one or more embodiments, one or more of resource orchestrators 102, one or more of SND controllers 104, one or more of NFV managers 106, one or more of NEs 112, one or more nodes (e.g., one or more classifier nodes 420, one or more forwarding nodes 425, one or more service nodes 440, etc.), and/or one or more domain controllers 415 may include one or more structures and/or functionalities of those described with reference to data processing system 610.

Figure 7:
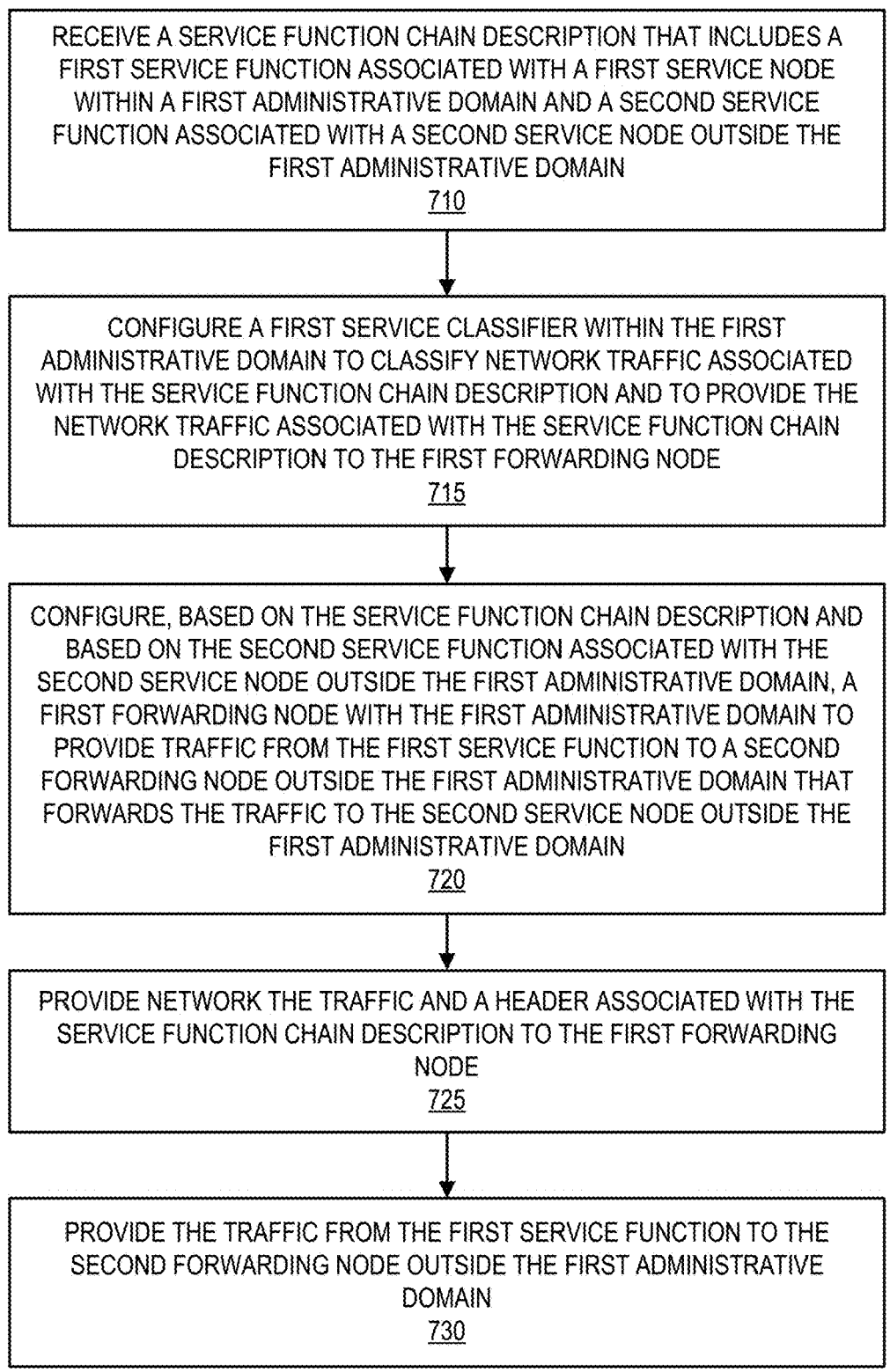
FIG. 7 illustrates a method of enabling service function chains, according to one or more embodiments.

Turning now to FIG. 7, a method of enabling service function chains is illustrated, according to one or more embodiments. At 710, a service function chain description that includes a first service function associated with a first service node within a first administrative domain and a second service function associated with a second service node outside the first administrative domain may be received. For example, the first administrative domain may be administrative domain 410-1, and SFC description 505 may include the first service function associated with the first service node and the second service function associated with the second service node outside the first administrative domain. For instance, the first service node may be service node 440-11 that implements the first service function, and the second service node may be service node 440-21, outside administrative domain 410-1, that implements the second service function.

At 715, a first service classifier may be configured to classify network traffic associated with the service function chain description and to provide the network traffic associated with the service function chain description to the first forwarding node. For example, the first service classifier may be classifier node 420-1, and classifier node 420-1 may be configured to classify network traffic 430-1 associated with SFC description 505 and to provide network traffic 430-1 associated with SFC description to forwarder node 425-11.

At 720, the first forwarding node within the first administrative domain may be configured, based on the service function chain description and based on the second service function associated with the second service node outside the first administrative domain, to provide data from the first service function to a second forwarding node outside the first administrative domain that forwards traffic to the second service node outside the first administrative domain. For example, forwarder node 425-11 may be configured to provide data from service node 440-11 to forwarder node 425-21 (e.g., the second forwarding node), outside administrative domain 410-1. In one instance, domain controller 415-1 may configure forwarder node 425-11 to provide data from service node 440-11 to forwarder node 425-21. In another instance, arbiter 505 may configure forwarder node 425-11 to provide data from service node 440-11 to forwarder node 425-21.

At 725, network traffic and a header associated with the service function chain description may be provided to the first forwarding node. For example, classifier node 420-1 may provide traffic 430-1 and a network service header, associated with SFC description 505, to forwarder node 425-11. For instance, the network service header may include a SFC ID and/or label that forwarder node 425-11 may utilize to steer and/or direct traffic 430-1 to service node 440-11. At 730, data from the first service function may be provided to the second forwarding node outside the first administrative domain. For example, the first forwarding node may provide the data from the first service function to the second forwarding node outside the first administrative domain. For instance, forwarder node 425-11 may provide data from service node 440-11 to forwarder node 425-21, outside administrative domain 410-1.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of enabling service function chains, the method comprising:
   receiving a service function chain description that includes a first service function associated with a first service node within a first administrative domain and a second service function associated with a second service node outside the first administrative domain;
   configuring, based on the service function chain description and based on the second service function associated with the second service node outside the first administrative domain, a first forwarding node within the first administrative domain to provide traffic from the first service function to a second forwarding node outside the first administrative domain that forwards the traffic to the second service node outside the first administrative domain; and
   the first forwarding node within the first administrative domain providing the traffic from the first service function to the second forwarding node outside the first administrative domain,
   wherein the configuring the first forwarding node within the first administrative domain to provide the traffic from the first service function to the second forwarding node outside the first administrative domain that forwards the traffic to the second service node outside the first administrative domain includes an arbiter associated with the first administrative domain and a second administrative domain, that includes the second forwarding node, configuring, based on the service function chain description and based on the second service function associated with the second service node outside the first administrative domain, the first forwarding node within the first administrative domain to provide the traffic from the first service function to the second forwarding node outside the first administrative domain that forwards the traffic to the second service node outside the first administrative domain.

2. The method of claim 1, further comprising:
   configuring a first service classifier within the first administrative domain to classify the traffic associated with the service function chain description and to provide the traffic associated with the service function chain description to the first forwarding node within the first administrative domain.

3. The method of claim 2, further comprising:
   the first service classifier providing a header associated with the service function chain description.

4. The method of claim 1, wherein the first forwarding node is a border node.

5. The method of claim 1, further comprising:
   configuring, based on the service function chain description and based on the first service function associated with the first service node within the first administrative domain, the second forwarding node outside the first administrative domain to provide the traffic from the second service function to the first forwarding node within the first administrative domain that forwards the traffic to the first service node within the first administrative domain.

6. A method of enabling service function chains, the method comprising:

receiving a service function chain description that includes a first service function associated with a first service node within a first administrative domain and a second service function associated with a second service node outside the first administrative domain;

receiving configuration information from an arbiter associated with the first administrative domain and a second administrative domain that includes the second forwarding node;

authenticating the configuration information from the arbiter;

configuring, based on the configuration information from the arbiter, based on the service function chain description, and based on the second service function associated with the second service node outside the first administrative domain, a first forwarding node within the first administrative domain to provide traffic from the first service function to a second forwarding node outside the first administrative domain that forwards the traffic to the second service node outside the first administrative domain; and the first forwarding node within the first administrative domain providing the traffic from the first service function to the second forwarding node outside the first administrative domain.

7. The method of claim 6,
wherein the second administrative domain includes the second service node outside the first administrative domain; and
wherein a single network domain includes the first second administrative domain and the second administrative domain.

8. A system that enables service function chains, comprising:
a processor; and
a memory, communicatively coupled to the processor, that stores processor-executable instructions;
wherein, when the processor-executable instructions are executed by the processor, the system:
receives a service function chain description that includes a first service function associated with a first service node within a first administrative domain and a second service function associated with a second service node outside the first administrative domain;
receives configuration information from an arbiter associated with the first administrative domain and a second administrative domain that includes the second forwarding node;
authenticates the configuration information from the arbiter;
configures, based on the configuration information from the arbiter, based on the service function chain description, and based on the second service function associated with the second service node outside the first administrative domain, a first forwarding node within the first administrative domain to provide traffic from the first service function to a second forwarding node outside the first administrative domain that forwards the traffic to the second service node outside the first administrative domain; and
provides, via the first forwarding node within the first administrative domain, the traffic from the first service function to the second forwarding node outside the first administrative domain.

9. The system of claim 8, wherein the memory stores further processor-executable instructions that when executed by the processor, the system:

configures a first service classifier within the first administrative domain to classify the traffic associated with the service function chain description and to provide the traffic associated with the service function chain description to the first forwarding node within the first administrative domain.

10. The system of claim 8, wherein the first forwarding node is a border node.

11. The system of claim 8, wherein the memory stores further processor-executable instructions that when executed by the processor, the system:
configures, based on the service function chain description and based on the first service function associated with the first service node within the first administrative domain, the second forwarding node outside the first administrative domain to provide the traffic from the second service function to the first forwarding node within the first administrative domain that forwards the traffic to the first service node within the first administrative domain.

12. The system of claim 8,
wherein the second administrative domain includes the second service node outside the first administrative domain; and
wherein a single network domain includes the first administrative domain and the second administrative domain.

13. A non-transitory computer readable memory device that stores processor-executable instructions, that when executed by a processor, the processor:
receives a service function chain description that includes a first service function associated with a first service node within a first administrative domain and a second service function associated with a second service node outside the first administrative domain;
receives configuration information from an arbiter associated with the first administrative domain and a second administrative domain that includes the second forwarding node;
authenticates the configuration information from the arbiter;
configures, based on the configuration information from the arbiter, based on the service function chain description, and based on the second service function associated with the second service node outside the first administrative domain, a first forwarding node within the first administrative domain to provide traffic from the first service function to a second forwarding node outside the first administrative domain that forwards the traffic to the second service node outside the first administrative domain; and
provides, via the first forwarding node within the first administrative domain, the traffic from the first service function to the second forwarding node outside the first administrative domain.

14. The non-transitory computer readable memory device of claim 13, wherein the memory device stores further processor-executable instructions, that when executed by the processor, the processor:
configures a first service classifier within the first administrative domain to classify the traffic associated with the service function chain description and to provide the traffic associated with the service function chain description to the first forwarding node within the first administrative domain.

15. The non-transitory computer readable memory device of claim 13, wherein the first forwarding node is a border node.

16. The non-transitory computer readable memory device of claim 13, wherein the memory device stores further processor-executable instructions, that when executed by the processor, the processor:

configures, based on the service function chain description and based on the first service function associated with the first service node within the first administrative domain, the second forwarding node outside the first administrative domain to provide the traffic from the second service function to the first forwarding node within the first administrative domain that forwards the traffic to the first service node within the first administrative domain.

* * * * *